United States Patent
Bertz et al.

(10) Patent No.: US 9,451,003 B1
(45) Date of Patent: Sep. 20, 2016

(54) METHOD AND SYSTEM FOR ADVANCED NOTIFICATION OF AVAILABILITY OF FAST CONTENT SWITCHING

(75) Inventors: Lyle T. Bertz, Lee's Summit, MO (US); Ayodeji Abidogun, Overland Park, KS (US); Woo J. Lee, Manhattan, KS (US); Badri P. Subramanyan, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2111 days.

(21) Appl. No.: 12/235,035

(22) Filed: Sep. 22, 2008

(51) Int. Cl.
*G06F 15/16* (2006.01)
*H04L 29/06* (2006.01)

(52) U.S. Cl.
CPC ............. *H04L 65/80* (2013.01); *H04L 65/608* (2013.01)

(58) Field of Classification Search
CPC ....................................................... H04L 65/80
USPC .................................................. 709/230–237
See application file for complete search history.

(56) References Cited

U.S. PATENT DOCUMENTS

| 6,407,680 | B1 * | 6/2002 | Lai et al. .......................... 341/50 |
| 7,093,274 | B2 * | 8/2006 | Dawson et al. .................. 725/93 |
| 2002/0190876 | A1 * | 12/2002 | Lai et al. ........................ 341/50 |
| 2007/0180135 | A1 * | 8/2007 | Kenrick et al. ................ 709/231 |
| 2007/0213038 | A1 * | 9/2007 | Masseroni et al. ......... 455/414.3 |
| 2007/0266122 | A1 * | 11/2007 | Einarsson et al. ............ 709/220 |
| 2008/0069032 | A1 * | 3/2008 | Liu ................................. 370/328 |
| 2008/0107108 | A1 * | 5/2008 | Bouazizi ........................ 370/389 |
| 2008/0151885 | A1 * | 6/2008 | Horn et al. .................... 370/389 |
| 2008/0191816 | A1 * | 8/2008 | Balachandran et al. .... 333/24 R |
| 2008/0195664 | A1 * | 8/2008 | Maharajh et al. ......... 707/104.1 |
| 2008/0216116 | A1 * | 9/2008 | Pekonen et al. ................ 725/39 |
| 2008/0228912 | A1 * | 9/2008 | Vedantham et al. .......... 709/224 |
| 2008/0263219 | A1 * | 10/2008 | Bacchi et al. ................. 709/231 |
| 2009/0282158 | A1 * | 11/2009 | Courtemanche .............. 709/231 |

OTHER PUBLICATIONS

Schulzrinne, et al., Real Time Streaming Protocol (RTSP), Network Working Group, Apr. 1998.
RealNetworks, Inc., "Fast Channel Switching," RealNetworks White Paper Series, 2008.
ETSI, Universal Mobile Telecommunication System (UMTS); Transparent end-to-end Packet-switched Streaming Service (PSS); Protocols and codecs (3GPP TS 26.234 version 7.5.0 Release 7), 3GPP, ESTI TS 126 234 V7.5.0 (Apr. 2008).

* cited by examiner

*Primary Examiner* — Hua Fan

(57) ABSTRACT

Disclosed herein is a method and system for triggering fast-content-switching with respect to streaming media such as RTSP streaming media for instance. When a server receives a DESCRIBE request or the like from a client that is engaged in an existing streaming media session, the server will determine if fast-content-switching is supported for switching from the existing session to the newly requested session. If so, the server will include in its reply to the DESCRIBE request a parameter (one or more pieces of data) that is interpretable by the client to mean that fast-content-switching is supported, so that the client will then request the server to start the new session without the client first engaging in SETUP transactions with respect to each media stream of the new session. This process can decrease latency in switching between sessions, by reducing the likelihood that a requested fast-content-switch will fail.

23 Claims, 4 Drawing Sheets

METHOD AND SYSTEM FOR ADVANCED NOTIFICATION OF AVAILABILITY OF FAST CONTENT SWITCHING

BACKGROUND

The present disclosure relates to real-time media streaming, where a server streams media content such as audio and/or video over a network to a client and the client plays out the received media stream in a continuous manner as the client receives the media. With improvements in network technology, the popularity of real-time media streaming has grown dramatically over recent years. It is now commonplace for users of personal computers and handheld wireless devices to watch movies or video clips streamed over the Internet in real-time and to listen to music streamed over the Internet in real-time. Watching or listening to media streamed in real-time over the Internet avoids the need to download a complete media file in advance, thereby conserving device memory and allowing for more of an on-demand media experience.

The well known Real Time Streaming Protocol (RTSP), defined by Request For Comments (RFC) 2326, published by The Internet Society in April 1998, defines industry standard procedures for handling media streaming over Internet Protocol (IP), and the present document will refer to certain procedures defined by RTSP. However, those of ordinary skill in the art will readily appreciate that other baseline streaming procedures, including variations of the RTSP procedures or other procedures altogether (whether or not using terminology similar to RTSP), could be used instead. Therefore, reference to RTSP (and/or its messages) in this document should not be viewed as limiting but should rather be viewed as representative.

In typical practice, to initiate a streaming media session, a user of a client device will select a media object or "channel," such as by clicking on a link representing the channel (in a channel listing or on a web page for instance). In response, the client will then send to a host server a DESCRIBE request that designates the desired media object, typically by a Uniform Resource Locator (URL). Upon receipt of the DESCRIBE request, the server will then send to the client a reply message (such as a "200 OK" message) that includes a presentation description for the media session, typically in a Session Description Protocol (SDP) format. Among other information, the presentation description may list one or more media streams (such as an audio stream and a video stream) that would be provided in the requested session, as well as the applicable codecs and other initialization parameters for the session.

Once the client has received the presentation description, the client will then engage in a setup process for each designed media stream, to establish or agree with the host server on a transport mechanism through which each media stream will be transmitted from the server to the client. With respect to each media stream designated in the DESCRIBE reply, for instance, the client will typically send to the server a SETUP request that indicates a preferred transport protocol, such as Real-time Transport Protocol (RTP) (defined by RFC 3550, published by The Internet Society in July 2003), and that indicates the client ports (e.g., Transmission Control Protocol (TCP) port(s)) to be used for the media stream. In response to each SETUP request, the server may then send to the client a reply (such as a 200 OK message) that provides a session identifier and that designates the server port(s) to be used for the stream.

After agreeing on the transport mechanism, the client will then send one or more PLAY requests to the server, designating the session identifier and directing the server to start streaming the media via the agreed transport mechanism. And in response, the server will begin to stream the designated media to the client, for real-time playout by the client. In practice, if a session includes more than one media stream (e.g., a video stream and an audio stream), the client may send a single PLAY request that lists and requests playout of multiple streams of a session (e.g., both audio and video streams), or the client may send separate PLAY requests for the various streams. Further, a PLAY request may define a time range of the media stream to be transmitted, by specifying start and stop time points for instance, in which case the server would respond by streaming the designated portion of the media.

As with broadcast television channels and radio stations, it would be advantageous if a user receiving streaming media from a server could change channels, or switch between streaming media sessions, on demand. Further, it would be beneficial for a client device to be able to automatically switch from one media session to another in accordance with a playlist or the like.

Unfortunately, however, given the typical session initiation process as described above for instance, a user may experience a substantial delay when switching from one streaming media session to another. For instance, if the newly requested media session includes both audio and video streams, the back-and-forth initialization signaling that would occur between the client and server to set up the new session including each of those streams could take several seconds to complete.

Recognizing this problem at least in the context of mobile wireless devices, the Third Generation Partnership Project (3GPP) has developed a signaling process that can be used by a client to facilitate more seamless switching from one media session to another. In accordance with the signaling process, the client would forego sending any SETUP requests for the new media session but would rather simply send a PLAY request (or multiple PLAY requests) for the new session, including in the PLAY request one or more "fast-content-switching" tags (e.g., a "3gpp-switch" option tag) that directs the server to simply switch to streaming content of the new session in place of streaming content of the old session. In particular, for each stream in the new session that is of the same type as a stream in the old session (e.g., given an audio stream in the new session and an audio stream in the old session, or given a video stream in the new session and a video stream in the old session, etc.), the client would simply include in the PLAY request a fast-content-switching tag that designates the old stream's URL and the new stream's URL.

In response to a fast-content-switching request with respect to a given old stream and a given new stream, the server will effectively splice the new stream onto the old stream. Thus, after the client has played all of the buffered media for the old session (or has flushed its streaming media buffer to remove the data for the old session), the client could seamlessly begin playing media of the new session. Furthermore, in the server's reply to a PLAY request that contained one or more fast-content-switching tags, the server may include a parameter (such as a new Synchronization Source (SSRC) code) that, when detected by the client, will cause the client to update its descriptive data (such as channel name, etc.) for the stream or session and to more seamlessly switch from each old stream to each new stream.

Fast-content-switching assumes that the client can continue applying largely the same transport mechanism and, particularly, the same decoder(s) when switching from playout of streaming media in one session to playout of streaming media in a new session. For example, if the client is currently engaged in a streaming media session in which the client is receiving, decoding, and playing out an H.264 encoded video stream and an AAC encoded audio stream, then fast-content-switching would be supported for switching over to a new streaming media session that also provides an H.264 encoded video stream and an AAC encoded audio stream. In practice, the server would continue by splice the new H.264 video stream onto the old H.264 video stream, and the server would splice the new AAC encoded audio stream onto the old AAC encoded audio stream. As another example, if the client is currently engaged in a streaming media session in which the client is receiving a single stream defining interleaved H.263 video and MP3 audio, then fast-content-switching would be supported for switching over to a new streaming media session that also provides a stream defining interleaved H.263 video and MP3 audio. In that case, the server would continue by simply splicing the new H.263/MP3 stream onto the old H.263/MP3 stream.

With possibly some exceptions, fast-content-switching may not be supported if a stream of the newly requested session is of the same type as a stream of the old session but is not the same format as the old stream of that type. In particular, if the client would need to change its decoder state in order to begin playing the new stream in place of the old stream of the same type, then fast-content-switching may not be supported. In particular, given a new stream of the same type as a stream in the existing session, if the presentation description or SDP of the new stream is not compatible with the presentation description or SDP of the old stream, then fast-content-switching would not be supported.

(Note that if the newly requested media session includes a stream of a type that does not match the type of any stream in the existing session, fast-content-switching could still be supported for one or more other streams of the new session that each match a stream type in the existing session. For the new stream of the new type, the client may simply engage in a SETUP transaction with the server before requesting transmission of the new stream, thereby adding that new stream type into the ongoing session. Likewise, if the existing session includes a stream of a given type and the newly requested session does not include a stream of that type, fast-content-switching could still be supported for one or more other streams of the new session that each match a stream type in the existing session. For the no-longer-included stream type, the client may simply send to the server a Real Time Control Protocol (RTCP) "BYE" message to terminate the stream or may include a fast-content-switching tag that designates the old stream and designates no new stream, which would result in terminating the old stream.)

In accordance with the 3GPP recommendation, if a client sends a PLAY request that includes a fast-content-switching tag but the server then determines that the requested fast-content-switching is not supported (e.g., the server detects an incompatibility between the presentation description of the new session and a corresponding presentation description of the old session), the server will send to the client an error response (such as a "551 Not Supported" response). At that point, the client will then need to engage in a different process to set up the new session. Unfortunately, however, the client's failed attempt to use fast content switching will already have wasted valuable time, thereby increasing rather than decreasing the total time to switch from an existing streaming media session to a new streaming media session.

OVERVIEW

Disclosed herein is a method and system that helps to avoid the above problem. In accordance with the method, when a server receives from a client a DESCRIBE request or similar request seeking information about a new media object (e.g., a new stream or new session/channel), the server will determine whether fast-content-switching is supported for the new media object. For instance, if the client is currently engaged in a streaming media session, the server may determine whether fast-content-switching is supported for switching from the existing streaming media session to the new streaming media session. If the server determines that fast-content-switching is supported with respect to the new media object, then the server will include in its DESCRIBE reply a parameter that is interpretable by the client to mean that fast-content-switching is supported. In response, the client may then request fast-content-switching with a substantially reduced risk of receiving an error response. On the other hand, if the server determines that fast-content-switching is not supported with respect to the new media object, then the server may omit the parameter from its reply, or the server may include a different parameter that is interpretable by the client to mean that fast-content-switching is not supported. In that case, the client may then efficiently not request fast-content-switching but may instead engage in a full SETUP process with the server in order to set up the new streaming media session.

These as well as other aspects, advantages and alternatives, will become apparent to those of ordinary skill in the art by reading the following detailed description with reference where appropriate to the accompanying drawings. Further, it should be understood that the description in this overview section and elsewhere in this document is provided merely by way of example and not by way of limitation. Those of ordinary skill in the art will appreciate that numerous variations from the structures and functions described are possible while remaining within the spirit and scope of the claims.

DETAILED DESCRIPTION

Figure 1:
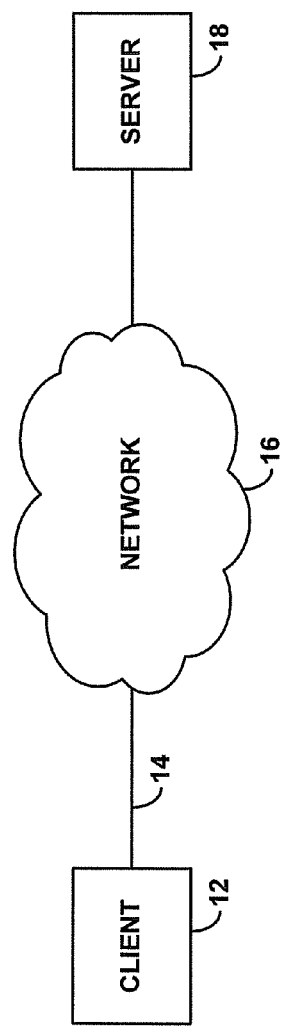
FIG. 1 is a simplified block diagram of a communication system in which an exemplary embodiment of the method can be implemented.

Referring to the drawings, as noted above, FIG. 1 is a generalized representation of a communication system in which the exemplary method can be implemented. As shown, the system includes a client device 12 coupled by communication link 14 with a network 16, and a server 18 sitting as a node on the network. In practice, the illustrated elements may take any of a variety of forms and may range in degree of complexity.

As a general matter, client device 12 is a communication device preferably operable by a human and equipped with a streaming media client that is capable of initiating streaming media sessions and receiving and playing out streaming media, in accordance with RTSP for instance. As such, client device 12 preferably includes a user interface through which a user can browse and select a desired media object, and through which the client device can present streaming media (e.g., audio and/or video) as it is being received. Further, the client device preferably includes a processor, data storage, and program logic stored in the data storage and executable by the processor to carry out various client functions described herein, such as initiating, controlling, and switching between streaming media sessions. Still further, client device 12 includes a network communication interface, such as a wireless chipset and antenna or a wired Ethernet interface for instance. As specific examples, client device 12 may comprise a personal computer or a handheld wireless device such as a cell phone or wirelessly-equipped personal digital assistant, or client device 12 may take some other form.

Communication link 14 provides a mechanism through which client device 12 can engage in communication with server 18. In practice, for instance, communication link 14 may comprise wireless and/or wireline components, and circuit-switched and/or packet-switched components. By way of example, communication link 14 may comprise a wired and/or wireless local area network on which client device 12 sits as a node. As another example, communication link 14 may comprise a cellular radio access network (RAN) and an air interface through which client device 12 can communicate with and be served by the RAN. Generally, communication link 14 can range from a simple direct wireless or wired connection to a more complex connection comprising any number of routers, switches and/or other elements.

Network 16, in turn, comprises a private and/or public communication network through which server 18 can stream media to client device 12. As such, network 16 may include circuit-switched and/or packet-switched components and may also range in degree of complexity from a simple direct wireless or wired connection to a more complex connection. As specific examples, network 16 may comprise a core transport network operated by a wireless service provider or internet service provider that serves client device 12, and/or network 16 may comprise the Internet or another packet-switched network, if not some other sort of communication network. Further, in a rudimentary embodiment, the network 16 and communication link 14 may be provided together as a single link between the client device 12 and the server 18.

Server 18 functions to stream media to client device 12 for playout by the client device as the client device receives the media, again in accordance with RTSP for instance. As such, the server 18 preferably includes a processor, data storage, and program logic stored in the data storage and executable by the processor to carry out various server functions described herein, including engaging in signaling communication with client device 12 to initialize and control streaming media sessions, transmitting media streams to client device 12, and switching between streaming media sessions. Further, server 18 includes a network communication interface, such as a wired Ethernet interface or a wireless network interface for instance, that enables server 18 to communicate on network 16.

In practice, server 18 may comprises one or more server computers or other nodes, such as a cluster of nodes for instance. By way of example, server 18 may include one server that engages in signaling communication to set up and/or control streaming media sessions and another server, in communication with the signaling server, that streams media to client devices such as client device 12. Furthermore, server 18 may comprise an origin server that hosts streaming media content (whether the content is stored on the server or is stored externally and is accessible to the server), and/or server 18 may comprise a proxy server (such as a reverse proxy server for instance) that sits between one or more origin servers and may cache and transcode content for streaming to client devices. Other arrangements are possible as well.

Figure 2:
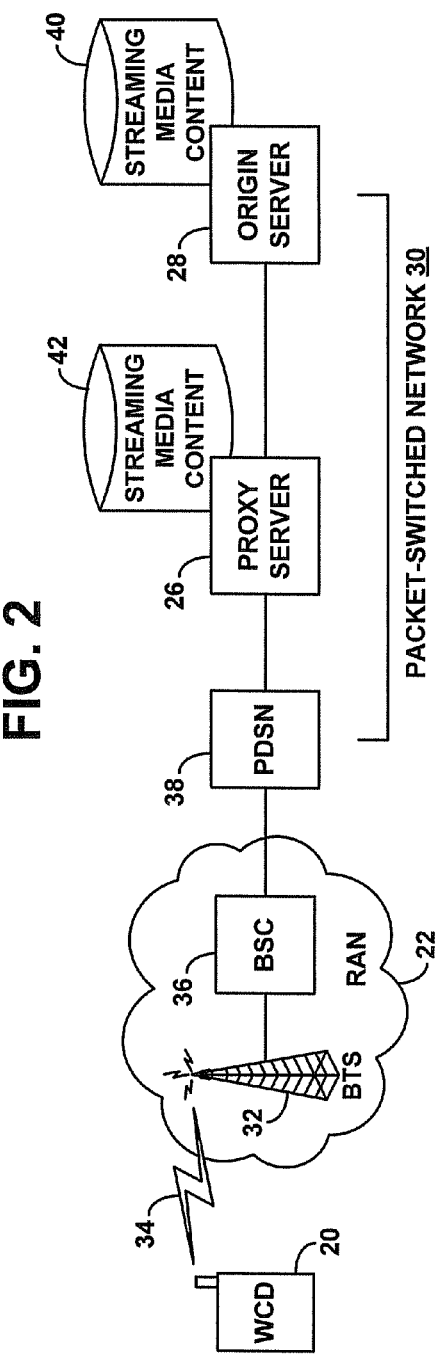
FIG. 2 is another simplified block diagram of a communication system in which the exemplary embodiment can be implemented.

FIG. 2 is next a block diagram depicting more specifically, but still by way of example, a configuration in which the client device is a cellular wireless communication device (WCD) 20 served by a RAN 22 that includes or provides connectivity with a proxy server 26, and in which the proxy server proxies communications such as RTSP signaling and media streams between an origin server 28 and WCD 20. In this configuration, the proxy server 26 and origin server 28 may both reside on a packet-switched network 30, such as the Internet or a private packet network, or the servers may reside on separate networks or elsewhere.

RAN 22 generally functions to provide wireless devices such as WCD 20 with wireless communication service, and particularly with an air interface and communication path through which the devices can communicate with other network entities, such as servers 26, 28, for instance. As such, RAN 22 can take generally any form. As shown, for example, the RAN may include a base transceiver station (BTS) 32 that includes an antenna arrangement for radiating to define an air interface 34 through which WCD 20 can communicate with the BTS 30. Equipment of the BTS 30 may then be coupled with a base station controller (BSC) 36 or radio network controller (RNC), which may in turn couple with a gateway such as a packet data serving node (PDSN) 38 that provides packet-network connectivity.

Air interface 34, RAN 22, WCD 20, may operate in accordance with any wireless communication protocol now known or later developed, examples of which include without limitation CDMA (e.g., CDMA2000, EV-DO), iDEN, TDMA, AMPS, GSM, GPRS, UMTS, EDGE, WiMAX (e.g., IEEE 802.16), LTE, microwave, millimeter wave, satellite, MMDS, Wi-Fi (e.g., IEEE 802.11), Bluetooth, and infrared. Through the chosen protocol, a served client device such as WCD 20 may obtain radio link connectivity with the RAN 22, data link connectivity with a gateway such as PDSN 38, and network connectivity such as an IP address to communicate with entities such as servers 26, 28.

In the configuration shown, proxy server 26 functions to proxy communications to and from origin server 28. In practice, proxy server 26 may be a reverse proxy server that enables a client device to communicate with multiple origin servers, so that the client device need merely communicate with the proxy server and the proxy server then communicates with the various origin servers, rather than the client device always having to establish communication sessions separately with the various origin servers. Alternatively or additionally, the proxy server may sit more transparently between the client device and one or more origin servers and may act upon communications passing between the client and the origin servers.

In an exemplary embodiment, proxy server 26 functions to cache streaming media content that origin server 28 transmits to various client devices, and proxy server 26 functions to transcode that content into a form that proxy server 26 itself can then transmit to devices requesting particular content.

By way of example, wireless devices served by RAN 22 may typically support particular media presentation, as the devices may have particular display screen dimensions and/or may be programmed with a limited number of media decoders for decoding and playing out incoming media streams. Consequently, one function of proxy server 26 may be to transcode media streams from origin server 28 into one of the supported presentation formats. Furthermore, in order to speed up initiation of streaming media sessions as a general matter, proxy server 26 may cache media streams that pass from origin server 28 to client devices, so that, when a client device such as WCD 20 thereafter sends a request for the same media content, the proxy server can respond and stream the content to the requesting device without the need to again request and receive the content from the origin server. As shown in FIG. 2, origin server 28 thus includes or has access to streaming media content 40 that origin server can stream to requesting client devices, and proxy server 26 includes or has access to streaming media content 42 (e.g., once cached and transcoded) that proxy server 26 can stream to requesting client devices.

The present method may occur primarily at the origin server 28 or primarily at the proxy server 26, if not at a combination of these servers or elsewhere. At either server 28, the method may involve the server receiving from WCD 20 a DESCRIBE request or the like, designating a particular media object, and the server then determining whether fast content switching is supported for the requested media object and (i) if so, then including in its reply to the DESCRIBE request a parameter that the WCD will interpret to mean that fast-content-switching is supported, so that the WCD will then sensibly request fast-content-switching or (ii) if not, then not including that parameter in its reply.

In general, the determination of whether fast-content-switching is supported may involve determining whether the server possesses the requested content in a format that is compatible with the format of content currently being streamed to the WCD, such that the WCD would not need to switch decoders for a given type of stream. This determination may thus involve (i) determining if the server possesses the requested media object, (ii) determining the format of each stream currently being transmitted to the WCD, and (iii) determining whether the server possesses the requested media object in a format compatible with the determined format of each stream currently being transmitted to the WCD. This process thus assumes that the server has stored data indicating whether the WCD is currently engaged in streaming media session and, if so, indicating the presentation format(s) for the current streaming media session. At either server, the process may then involve referring to that data to determine the presentation format(s) of the current streaming media session and then determining whether the server possesses the requested media object in a compatible format such that fast-content-switching would be supported. At the proxy server in particular (but also perhaps at the origin server), the process of determining whether the server possesses the requested media object in a compatible format may involve determining whether the proxy server has cached the requested media object and, if necessary, has transcoded the requested media object into a compatible format.

Figure 3:
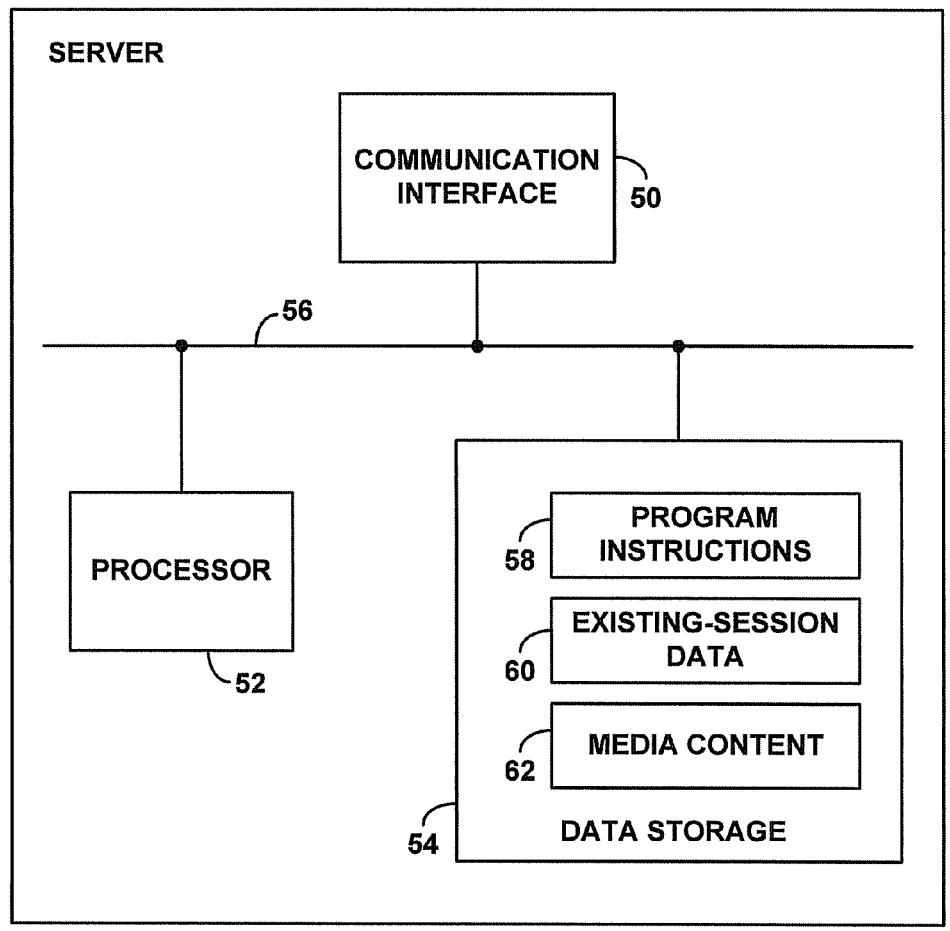
FIG. 3 is a block diagram showing some of the functional components of an exemplary server arranged to implement the method.

FIG. 3 is a block diagram depicting functional components of a server (e.g., proxy server 26 or origin server 28, if not some other server) equipped to carry out the present method. As shown, the exemplary server includes a communication interface 50, a processor 52, and data storage 54, all of which may be interconnected by a system bus, network, or other connection mechanism 56.

Communication interface 50 may function to communicatively link the server with a network, so that the server can communicate with other network entities. As such, the communication interface 50 may comprise a wired or wireless Ethernet interface or other sort of interface.

Processor 52 may comprise one or more general purpose processors (e.g., microprocessors) and/or one or more special purpose processors (e.g., digital signal processors or application specific integrated circuits). Data storage 54 may then comprise one or more volatile and/or non-volatile storage components, such as magnetic, optical, or organic storage components, and may be integrated in whole or in part with processor 52.

As shown, data storage may include program instructions 58 that are executable by processor 52 to carry out various functions described herein, to carry out the useful, concrete, and tangible result of providing WCD 20 with advanced notice of whether fast-content-switching is supported and thus enabling WCD 20 to efficiently decide whether or not to request fast-content-switching, thus reducing the likelihood that the WCD would request fast-content-switching then only to find out that fast-content-switching is not supported. These functions are not limited to implementation through program instructions, however, and could be carried out just as well in other forms.

Data storage 54 is further shown including existing-session data 60 and media content 62. Existing-session data 60 includes data that characterizes existing streaming media sessions being provided to various client devices. As such, the existing-session data 60 may be keyed to client device identifier and may specify, per client device, the presentation description (e.g., SDP in whole or in part, codecs, and/or other information) per stream and per streaming media session currently being served to the client device, such that the server can refer to the data to determine whether a newly requested media object is compatible with the format(s) of the existing session and thus whether fast-content-switching is supported.

Media content 62 then preferably comprises media content that the server can stream to a requesting client device. As such, the media content 62 may correspond with that shown as items 40 or 42 in FIG. 2 and, like other data storage components, may be located in or otherwise accessible to the server.

Figure 4:
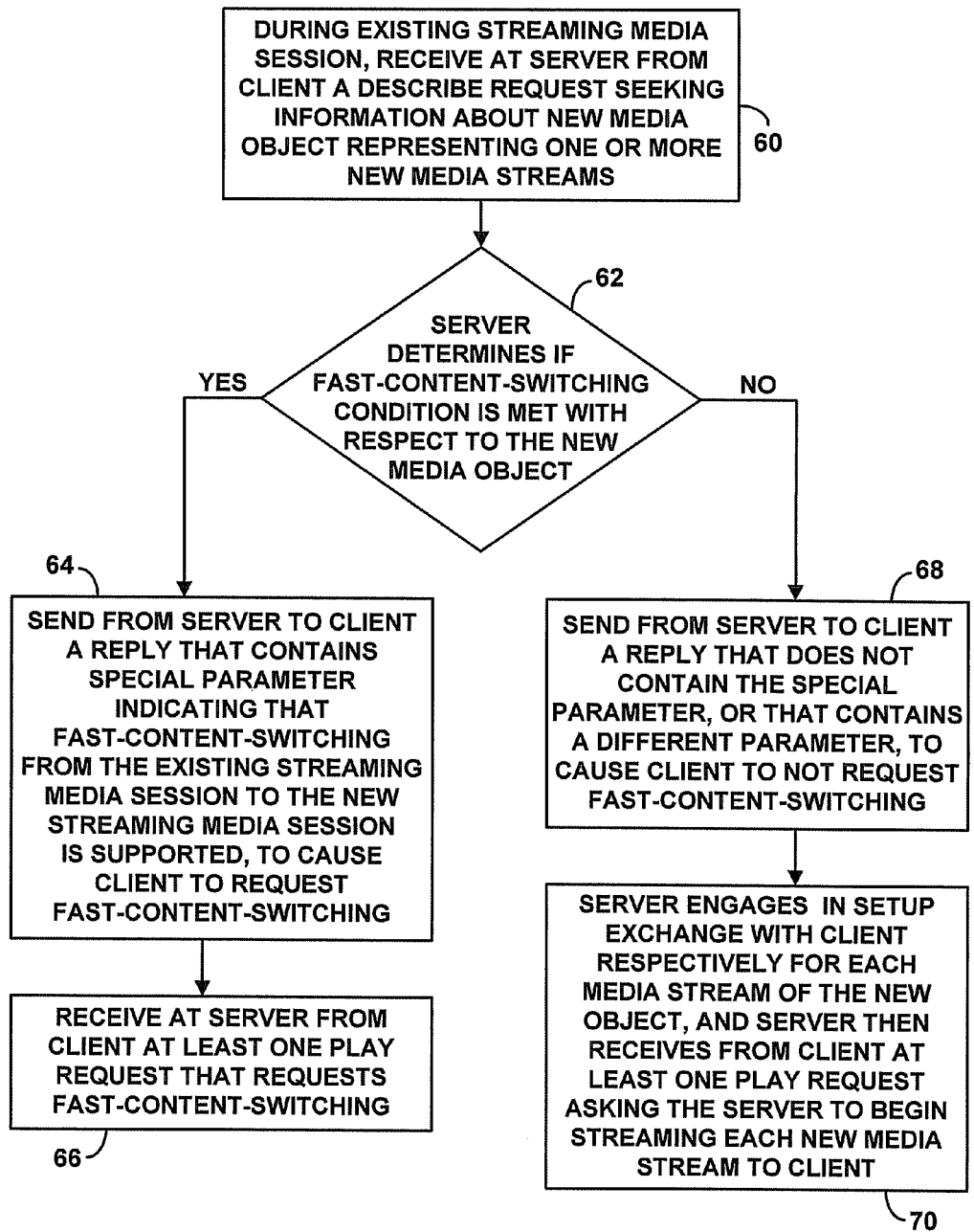
FIG. 4 is a flow chart depicting functions carried out in accordance with the present method.

FIG. 4 is next a flow chart depicting operation of the present method by way of example, to trigger fast content switching during a streaming media session in which a server is streaming one or more media streams to a client via a network for playout of each first media stream by the client as the client receives the first media stream. The illustrated method assumes that each media stream of the existing streaming media session has a respective type (e.g., audio, video, subtitles, or some other type) and a respective format (e.g., encoded with a particular codec and thus requiring a corresponding decoder to facilitate playout).

As shown in FIG. 4 at block 60, the method involves, during the existing streaming media session, receiving at the server from the client a DESCRIBE request seeking information about a new media object representing one or more new media streams that, if streamed from the server to the client, would define a new streaming media session. As with the existing streaming media session, each new media stream of the new media object has a respective type.

At block 62, the method next involves, responsive to the DESCRIBE request, making a determination at the server of whether a fast-content-switching condition is met with respect to the new media object. In particular, the fast-content-switching-condition would be met only if (among possibly other criteria), for each new media stream that is the same type as a media stream of the existing streaming media session, the server possesses (i.e., includes or has access to) the new media stream in the same format as the existing media stream of the same type that is being streamed to the client.

For example, if the new media object defines solely an audio stream, a video stream, and a subtitles stream, and the existing session consists of an audio stream and a video stream, then the fast-content-switching condition would be or comprise that (i) the server possesses the new audio stream in a format compatible with the existing audio stream such that server can transmit the new audio stream in that format and the client would not need to switch audio decoders to be able to decode the new audio stream and (ii) the server possesses the new video stream in a format compatible with the existing video stream such that the server can transmit the new video stream in that format and the client would not need to switch video decoders to be able to decide the new video stream. (As for the subtitle stream of the new media object, the client could simply engage in a separate setup process.)

As another example, if the new media object defines solely an audio stream, and the existing session defines solely an audio stream, then the fast-content-switching condition would be or comprise that the server possesses the new audio stream in a format compatible with the existing audio stream such that server can transmit the new audio stream in that format and the client would not need to switch audio decoders to be able to decode the new audio stream. Other examples are possible as well.

To determine if a given stream is the same format as an existing stream, the server may thus first identify matches between media stream types in the existing session and the newly requested media object. In turn, the server may then compare predefined SDPs for the two streams of each identified match (e.g., comparing the binary files or the header values of the SDPs). Alternatively, the server may compare just one or more portions of the SDPs or some other type of descriptors for the two streams, preferably taking into consideration whether a change in decoder state would be required at the client in switching from the existing session to the new session.

Note that making the determination of block 62 in response to the DESCRIBE request can involve performing the comparison of stream formats, or more generally, the analysis of compatibility in response to receipt of the DESCRIBE request. Alternatively, to speed up the process even further, the comparison and/or analysis could be performed in advance of receiving the DESCRIBE request, such as generally between pairs of media objects, so that the server could maintain or have access to data indicating whether fast-content-switching is supported between various pairs of media objects. In that case, in response to the DESCRIBE request, the server could refer to that predefined data to determine whether, for the media object currently being streamed (as one or more streams) to the client, fast-content-switching would be supported to transition over to streaming the media object that is the subject of the DESCRIBE request. Other procedures for making the determination could be used as well.

If the server thereby determines that the fast-content-switching condition is met with respect to the new media object, then, at block 64, the method involves sending from the server to the client, in response to the DESCRIBE request, a reply that contains a special parameter indicating that that fast-content-switching from the existing streaming media session to the new streaming media session is supported. The special parameter is preferably one that is interpretable by the client to cause the client to request fast-content-switching from the existing streaming media session to the new streaming media session.

In particular, the client will preferably then request the server to begin streaming to the client at least one media stream of the new object in place of at least one media stream of the existing session, without the client first sending to the server any SETUP request for the at least one new media stream. Thus, at block 66, the server would receive from the client at least one PLAY request that contains at least one fast-content-switching tag and that requests the server to switch from streaming at least one media stream of the existing session to streaming at least one media stream of the new object. By way of example, the fast-content-switching tag may be a "3gpp-switch" tag, as defined by the 3GPP recommendation noted above.

On the other hand, if the determination is that the fast-content-switching condition is not met with respect to the new media object, then, at block 68, the method involves instead sending from the server to the client, in response to the DESCRIBE request, a reply that does not contain the special parameter, or that contains a different parameter. The absence of the special parameter, or the existence of the different parameter, will preferably cause the client to not request fast-content-switching from the first streaming media session to the second streaming media session.

In particular, the client will preferably then engage in at least one SETUP exchange with the server for each media stream of the new session before the client then requests the server to begin streaming each new media stream to the client. Thus, at block 70, the server would engage in a SETUP exchange with the client respectively for each media stream of the new object, and the server would then receive from the client at least one PLAY request asking the server to begin streaming each new media stream to the client.

In a preferred implementation, the reply that the server sends in response to a DESCRIBE request will include a server-ID field. Particularly where the server is the proxy server, but otherwise as well, the special parameter can be a predefined value in the server-ID field. Thus, the client would execute program logic to look for that predefined server-ID value. If the client finds the value, the client will then request fast-content-switching. Whereas, if the client does not find the value (or finds a different predefined server-ID value that indicates the client should not request fast-content-switching), then the client would not request fast-content-switching. Alternatively, even if the reply contains a server-ID field, the parameter could be predefined to take some other form, provided that the parameter would be understood by the recipient client device in the manner described herein.

Figure 5:
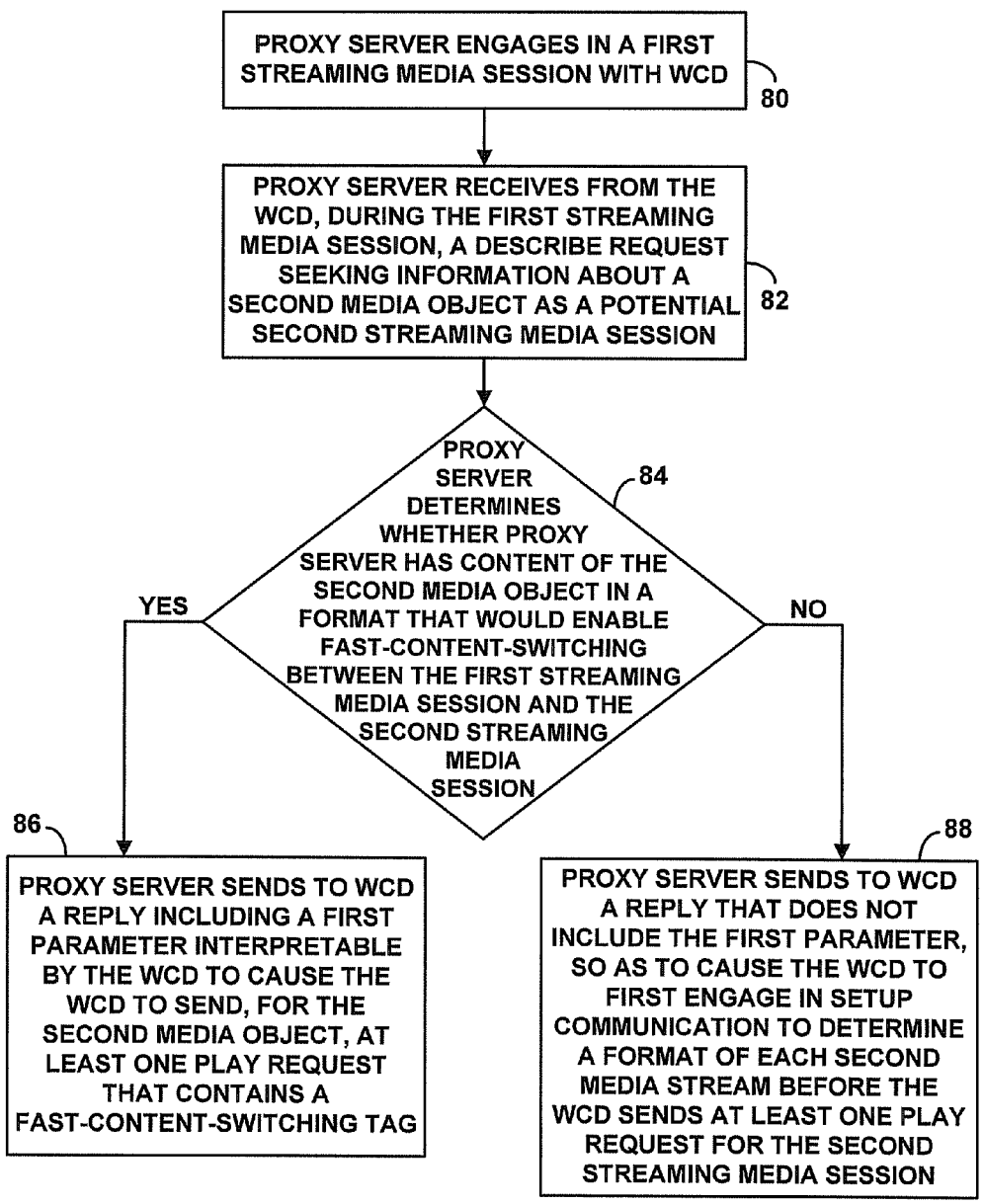
FIG. 5 is another flow chart depicting functions carried out in accordance with the present method.

FIG. 5 is next another flow chart depicting functions that can be carried out by the present system, to trigger fast-content-switching. As described above, the system may include a proxy server situated in a communication path between a content server and multiple wireless communication devices (WCDs), and the proxy server may function to cache streaming media content streamed from the content server to WCDs and to transcode streaming media content to one or more forms compatible with recipient WCDs.

Through execution of program instructions or in some other manner, the proxy server may carry out the exemplary method to provide the useful, concrete and tangible result as discussed above.

In particular, as shown in FIG. 5, at block 80, the method may begin as the proxy server engages in a first streaming media session with a WCD, in which the proxy server streams at least one first media stream to the WCD, for playout by the WCD as the WCD receives the at least one first media stream. At block 82, the proxy server then receives from the WCD, during the first streaming media session, an RTSP DESCRIBE request seeking information about a second media object as a potential second streaming media session.

At block 84, responsive to the RTSP DESCRIBE request, the proxy server then makes a determination of whether the proxy server has (i.e., includes or has access to) content of the second media object in a format that would enable fast-content-switching between the first streaming media session and the second streaming media session. This determination may be with respect to a given stream of the second media object/session, or the determination may be with respect to multiple such streams.

If the determination is that the proxy server has content of the second media object in a format that would enable fast-content-switching between the first streaming media session and the second streaming media session, then, at block 86, in response to the DESCRIBE request, the proxy server sends to the WCD a reply including a first parameter interpretable by the WCD to cause the WCD to send, for the second media object, at least one RTSP PLAY request that contains a fast-content-switching tag.

On the other hand, if the determination is that the proxy server does not have content of the second media object in a format that would enable fast-content-switching between the first streaming media session and the second streaming media session, then instead, at block 88, the proxy server sends to the WCD a reply that does not include the first parameter, so as to cause the WCD to first engage in SETUP communication to determine a format of each second media stream before the WCD sends at least one RTSP PLAY request for the second streaming media session.

As above, the first parameter can take the form of a first predefined server-ID value, and a reply that does not include the first parameter can instead include a second (i.e., different) predefined server-ID value. Alternatively, a parameter other than server-ID could be used. Furthermore, also as above, the fast-content-switching tag could comprise a 3gpp-switch option tag or could take some other form as well.

It should be understood from the foregoing description that the format of a given media stream can be defined by the data file of the content to be streamed even before the content is being streamed. For instance, a given media object may define both audio and video streams by including audio to be streamed and video to be streamed. The format of the audio can be defined at least in part in terms of the codec used to encode (and thus to be used to decode) the audio. And the format of the video can be defined at least in part in terms of the codec used to encode (and thus to be used to decode) the video. Other format analyses can be conducted as well.

An exemplary embodiment has been described above. Those skilled in the art will appreciate, however, that various modifications can be made while remaining within the scope and spirit of the invention, as defined by the claims.

What is claimed is:

1. A method of triggering fast content switching during a first streaming media session in which a server is streaming one or more first media streams to a client via a network for playout of each first media stream by the client as the client receives the first media stream, wherein each first media stream has a respective type and a respective format, the method comprising:
   during the first streaming media session, receiving at the server from the client a DESCRIBE request seeking information about a second media object representing one or more second media streams that, if streamed from the server to the client, would define a second streaming media session, wherein each second media stream has a respective type, and wherein the DESCRIBE request is a precursor to the client requesting the server to begin streaming the one or more second media streams;
   responsive to the DESCRIBE request, making a determination at the server of whether a fast-content-switching condition is met with respect to the second media object, wherein the fast-content-switching-condition is met only if, for each second media stream that is the same type as a first media stream of the first streaming media session, the server possesses the second media stream in the same format as the first media stream of the same type that is being streamed to the client; and
   if the determination is that the fast-content-switching condition is met with respect to the second media object, then sending from the server to the client, in response to the DESCRIBE request, a reply that contains a first parameter indicating that fast-content-switching from the first streaming media session to the second streaming media session is supported, so as to cause the client to request fast-content-switching from the first streaming media session to the second streaming media session.

2. The method of claim 1, further comprising:
   if the determination is that the fast-content-switching condition is not met with respect to the second media object, then instead sending from the server to the client, in response to the DESCRIBE request, a reply that does not contain the first parameter, so as to cause the client to not request fast-content-switching from the first streaming media session to the second streaming media session.

3. The method of claim 2,
   wherein causing the client to request fast-content-switching from the first streaming media session to the second streaming media session comprises causing the client to request the server to begin streaming to the client at least one second media stream in place of at least one first media stream without the client first sending to the server any SETUP request for the at least one second media stream; and
   wherein causing the client to not request fast-content-switching from the first streaming media session to the second streaming media session comprises causing the client to engage in at least one SETUP exchange with the server for each second media stream before the client then requests the server to begin streaming each second media stream to the client.

4. The method of claim 1, wherein the first parameter comprises a predefined server-ID value.

5. The method of claim 2, wherein the DESCRIBE reply that does not contain the first parameter instead contains a second parameter, wherein the second parameter causes the client to not request fast-content-switching from the first streaming media session to the second streaming media session.

6. The method of claim 3, wherein the first parameter comprises a first predefined server-ID value, and wherein the second parameter instead comprises a second predefined server-ID value.

7. The method of claim 1, wherein the DESCRIBE request comprises a Real Time Streaming Protocol (RTSP) DESCRIBE request.

8. The method of claim 1, wherein the server comprises a plurality of server nodes, a first node receiving and responding to the DESCRIBE request, and at least a second node streaming at least one of media streams.

9. The method of claim 1, further comprising:
if the determination is that the fast-content-switching condition is met with respect to the second media object, then, after sending the reply that contains the first parameter, receiving at the server from the client at least one PLAY request that contains at least one fast-content-switching tag and that requests the server to switch from streaming at least one first media stream to streaming at least one second media stream; and
if the determination is that the fast-content-switching condition is not met with respect to the second media object, then, after sending the reply that does not contain the first parameter, the server engaging in a SETUP exchange with the client respectively for each second media stream, and the server then receiving from the client at least one PLAY request asking the server to begin streaming each second media stream to the client.

10. The method of claim 9, wherein the fast-content-switching tag comprises a 3gpp-switch option tag.

11. The method of claim 1, wherein making the determination at the server of whether the fast-content-switching condition is met with respect to the second media object comprises:
identifying one or more second media streams each having the same type as a first media stream; and
for each identified second media stream, determining whether the server possesses the identified second media stream in a format that matches a format of the first media stream of the same type such that the client need not switch decoder states in order to switch from playout of the first media stream of the same type to playout of the identified second media stream.

12. The method of claim 1, wherein making the determination at the server of whether the fast-content-switching condition is met with respect to the second media object comprises:
identifying one or more second media streams each having the same type as a first media stream; and
for each identified second media stream, determining whether the server possesses the identified second media stream in a Session Description Protocol (SDP) format that matches an SDP format of the first media stream of the same type.

13. The method of claim 1, carried out at a proxy server between a content server and the client.

14. The method of claim 1, wherein the server comprises a proxy server between a content server and the client, wherein the proxy server caches content transmitted by the content server and the proxy server transcodes the content to one or more forms for client compatibility, and wherein making a determination at the server of whether the fast-content-switching condition is met with respect to the second media object comprises:
identifying one or more second media streams each having the same type as a first media stream; and
for each identified second media stream, determining whether (i) the proxy server has the identified second media stream cached and (ii) the proxy server has the second media stream transcoded to the same format as the first media stream of the same type.

15. The method of claim 1, wherein the client comprises a wireless communication device (WCD), and wherein signaling and media between the WCD and the server passes through an air interface and radio access network serving the WCD.

16. A method of triggering fast content switching comprising:
streaming from a server to a wireless communication device (WCD), via a network and an air interface, a first media stream, for playout of the first media stream by the WCD as the WCD receives the first media stream, wherein the first media stream has a given format;
during the streaming of the first media stream, receiving at the server from the WCD a DESCRIBE request seeking information about a second media stream designated by the DESCRIBE request, wherein the DESCRIBE request is a precursor to the WCD requesting the server to stream the second media stream to the client;
responsive to the DESCRIBE request, making a determination at the server of whether the server possesses the second media stream in the given format;
if the determination is that the server possesses the second media stream in the given format, then sending from the server to the WCD, in response to the DESCRIBE request, a reply containing a first parameter that causes the WCD to send to the server a PLAY request that contains a fast-content-switching tag; and
if the determination is that the server does not possess the second media stream in the given format, then instead sending from the server to the WCD, in response to the DESCRIBE request, a reply that does not contain the first parameter and that causes the WCD to engage in SETUP communication with the server for the second media stream and to then send to the server a PLAY request that does not contain the fast-content-switching tag.

17. The method of claim 16, wherein the fast-content-switching tag comprises a 3gpp-switch option tag.

18. The method of claim 16, wherein the first parameter comprises a predefined server-ID value.

19. The method of claim 16, wherein the reply that does not contain the first parameter instead contains a second parameter that causes the WCD to engage in SETUP communication with the server for the second media stream and to then send to the server a PLAY request that does not contain the fast-content-switching tag.

20. The method of claim 16, wherein the first parameter comprises a first predefined server-ID value, and the second parameter comprises a second predefined server-ID value.

21. A system for triggering fast content switching, the system comprising:
a proxy server disposed in a communication path between a content server and multiple wireless communication devices (WCDs), wherein the proxy server caches streaming media content streamed from the content server to WCDs, and wherein the proxy server transcodes streaming media content to one or more forms compatible with recipient WCDs;

program logic stored in data storage at the proxy server and executable by a processor of the proxy server to carry out functions comprising:

(a) engaging in a first streaming media session with a WCD, in which the proxy server streams at least one first media stream to the WCD, for playout by the WCD as the WCD receives the at least one first media stream, (b) receiving from the WCD, during the first streaming media session, a Real Time Streaming Protocol (RTSP) DESCRIBE request seeking information about a second media object as a potential second streaming media session, wherein the DESCRIBE request is a precursor to the WCD requesting initiation of the second streaming media session, (c) responsive to the RTSP DESCRIBE request, making a determination of whether the proxy server has content of the second media object in a format that would enable fast-content-switching between the first streaming media session and the second streaming media session, (d) if the determination is that the proxy server has content of the second media object in a format that would enable fast-content-switching between the first streaming media session and the second streaming media session, then, in response to the DESCRIBE request, sending to the WCD a reply including a first parameter interpretable by the WCD to cause the WCD to send, for the second media object, at least one RTSP PLAY request that contains a fast-content-switching tag, and (e) if the determination is that the proxy server does not have content of the second media object in a format that would enable fast-content-switching between the first streaming media session and the second streaming media session, then instead sending to the WCD, in response to the DESCRIBE request, a reply not including in the reply the first parameter, so as to cause the WCD to first engage in SETUP communication to determine a format of each second media stream before the WCD sends at least one RTSP PLAY request for the second streaming media session.

22. The system of claim 21, wherein the first parameter comprises a first predefined server-ID value, and wherein the reply that that does not include the first parameter instead includes a second parameter comprising a second predefined server-ID value.

23. The system of claim 21, wherein the fast-content-switching tag comprises a 3gpp-switch option tag.

* * * * *